Figure 4:
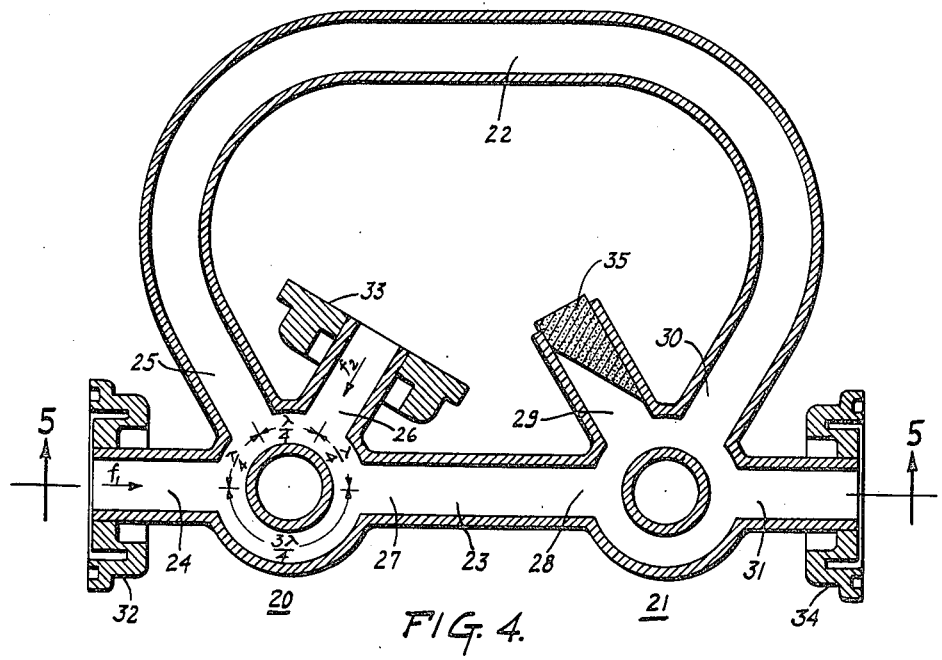

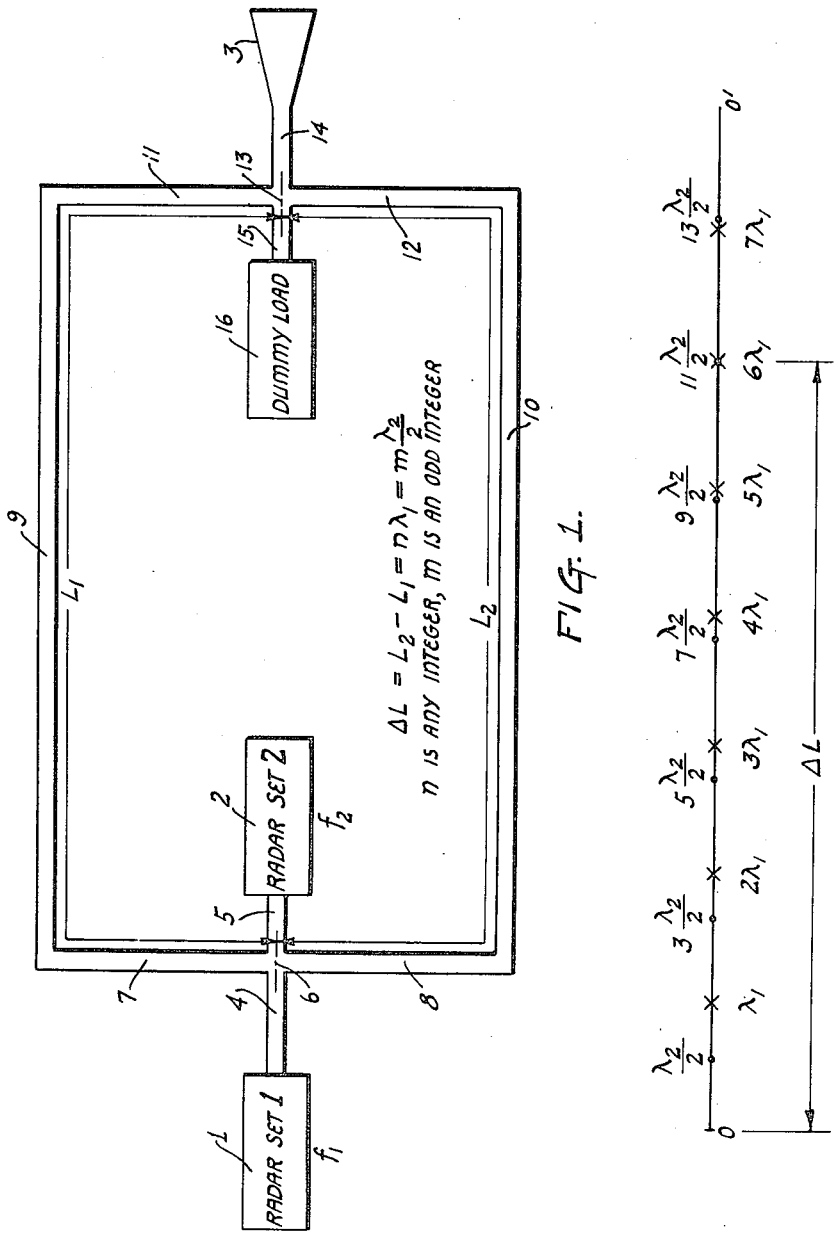

INVENTOR.
DAVID E. SUNSTEIN
BY
Allen V. Hopkins
AGENT

United States Patent Office 2,702,371
Patented Feb. 15, 1955

2,702,371

HYBRID NETWORK FOR COMBINING AND SEPARATING ELECTROMAGNETIC WAVE SIGNALS

David E. Sunstein, Cynwyd, Pa., assignor to Philco Corporation, Philadelphia, Pa., a corporation of Pennsylvania Application February 17, 1949, Serial No. 76,991

8 Claims. (Cl. 333—11)

My invention relates broadly to the propagation of high frequency electrical energy, and, more particularly, to the supply and distribution of microwave signals to high frequency energy utilization devices.

In certain applications, it is desirable to supply two separate high frequency electrical signals at two respectively different frequencies from two different sources to a common energy utilization means, without thereby producing interaction between said sources. For example, it may be desired to supply signals from the transmitters of two separate radar systems operating at different carrier frequencies, to a single antenna used in common for purposes of signal radiation, rather than to employ a separate antenna for each radar system. Such an arrangement is useful in airborne apparatus for the detection of moving objects, in which the signals received by the two individual radar systems are subsequently combined to produce improved discrimination against objects whose apparent velocities are relatively low. Among the obvious advantages to be obtained in this instance are the elimination of a space-consuming and relatively expensive antenna structure, and, if the frequencies involved are approximately the same, the provision of substantial identity between the directionality of the radiation and reception characteristics of the two radar systems. However, it is usually important that the means employed for supplying signals from said transmitters to said common antenna preserve the independence of functioning of each transmitter; for it is well known that if interaction between the transmitters of two radar systems be permitted to exist to any substantial extent, undesirable instability in the operation of said transmitters may result. It is for this reason that ordinary waveguide Y-junctions or T-junctions are unsatisfactory for this purpose, since such junctions are not capable in themselves of preventing such interaction.

Similarly it may be desirable under certain circumstances to provide for the separation of a composite signal, containing components at two different frequencies, into two portions, each comprising a different one of said components, and for the application of the separated portions respectively to two separate utilization devices, while at the same time avoiding undesirable interaction between the utilization devices. This problem also is presented in the aforementioned example where two separate radar systems are employed in conjunction with a common antenna. In this instance, signals of both of the transmitted frequencies are reflected from target objects and the reflections are intercepted by the same antenna. It is then necessary to separate the received reflections according to their frequencies, and to supply them respectively to the radar systems from which the signals which produced them originated.

Accordingly, it is an object of my invention, in one aspect, to provide means for combining high frequency signals from two separate sources and at two respectively different frequencies for application to a common energy utilization device, without thereby producing interaction between said sources.

It is a further object to provide a device in which said combining action is achieved in a particularly efficient manner.

Another object of the invention is to provide means for separating a composite signal, comprising components at two different frequencies, into two portions, each comprising a different one of said components, and for supplying said components respectively to separate utilization devices, without producing substantial interaction between said utilization devices.

Still another object of my invention is to provide bilateral coupling between a first and a second device for signals of one frequency, and to provide similar coupling between said first device and a third device for signals of a second frequency, while preventing any substantial coupling between said second and third devices for signals of either of said frequencies.

Devices are known to the prior art, which comprise a pair of input terminals and a pair of output terminals, and which are characterized in that signals applied to one of the input terminals are transmitted to both output terminals so that a predetermined phase relationship exists between the signals appearing at the respective output terminals, while signals applied to the other input terminal are transmitted to both output terminals so that a predetermined different phase relationship exists between the signals appearing at the respective output terminals. The most familiar devices of this category, perhaps, are those which are in the form of electromagnetic waveguide junctions. One such device, for example, is the one commonly referred to as the "magic-T" junction. Essentially it comprises the combination of an E-plane T-junction and H-plane T-junction, both of which are familiar to those skilled in the art. Physically it consists of a section of standard waveguide of preferably rectangular cross-section, to which are joined two other sections of waveguide. The axes of the latter sections are both disposed perpendicularly to the axis of the first section and perpendicularly to each other, and the two sections are electrically coupled to the first section through openings in adjacent sides thereof. The open ends of the two latter guide sections are nominally referred to as input terminals, while the two ends of the first guide section are nominally referred to as output terminals. It will be observed, however, that the junction is reciprocal in its operation and that signals may be applied either to the input terminals or to the output terminals with different results. Thus, if signals are applied to one of the input terminals, they will be transmitted in substantially equal magnitudes to both output terminals and the signals appearing at the output terminals respectively will be in phase, while, if signals are applied to the other input terminal, they will likewise be transmitted in substantially equal magnitudes to both output terminals but the signals appearing at the respective output terminals will be of opposite phase. On the other hand, if signals of substantially equal magnitudes are applied to both of the output terminals and are substantially in phase with each other, they will be transmitted substantially exclusively to the first-mentioned input terminal, while if signals of substantially equal magnitudes are applied to said output terminals and are of substantially opposite phase, they will be transmitted substantially exclusively to said second mentioned input terminal. It is to be observed that, while the transmission of signals from the two output terminals to a particular input terminal of the "magic-T" junction, as customarily employed, is achieved with maximum efficiency when the signals thus applied are of substantially equal magnitudes, departure from this condition will affect the efficiency of operation of the junction only by degrees. Depending upon the magnitude of the departure the effectiveness of the junction in transmitting energy to but one of the input terminals will be reduced, so that, as the magnitude of the departure increases, a greater fraction of the total energy will be supplied to another input terminals. However, provided the departure from the condition of equal magnitudes is not unduly large, the failure of the junction to transmit all of the energy to one terminal may not be objectionable.

Another known form of waveguide junction having characteristics similar to those of the "magic-T" is the so-called hybrid ring. This form of junction comprises essentially a closed section of wave guide in the form of an annulus, to which are electrically coupled, at points appropriately spaced around the circumference, four other waveguide sections. As in the case of the "magic-T," the open ends of two of these sections are designated input terminals to the junction, while the open ends of the other two are designated output terminals. Again as in the case of the "Magic-T," signals applied to one of the input terminals will appear at both output terminals in the same phase, while signals applied to the other input terminal will appear at both output terminals in opposite phase. Also signals applied simultaneously to both output terminals will be transmitted to one of the input terminals if they are in phase and to the other input terminal if they are of opposite phase. As in the case of the "magic-T," the effectiveness of the hybrid ring, in separating signals supplied to its output terminals will be greatest when the signals thus supplied are of equal magnitudes.

Both of the forms of waveguide junctions just described are characterized in that none of the signals applied to either of the input terminals will be transmitted, to any appreciable extent, to the other input terminal. Because of this fact, junctions of these forms may be used for the purpose of combining signals from separate sources applied respectively to their input terminals, a combination of the two input signals being derivable from either of the two output terminals. However, it is to be observed that the energy contained in the two input signals will be divided almost equally between the two output terminals, and hence that if the output from but one of the output terminals is used, approximately half of the input energy will be wasted. On the other hand, owing to the difference in phase relationship between the signals appearing at the two output terminals, depending upon whether they are produced in response to signals applied to one or the other of the input terminals, it is not feasible to combine the two outputs into a single signal merely by using any of the well-known signal combining devices such as Y or T waveguide junctions; for, if signals from the two output terminals are supplied to the branches of a Y- or T-junction so that their components, produced in response to signals applied to one of the input terminals, will be in phase with each other so as to add constructively, then the components produced in response to signals applied to the other input terminal will be in phase opposition and will add destructively. Thus only one of the input signals will appear in the combined output and the objective of combining them will be defeated.

If, however, the signals supplied respectively to the input terminals of the waveguide junction are of different frequencies, then the signals supplied to each of the output terminals will comprise components at both of these input frequencies. Under these circumstances, I have discovered, it is possible to supply the signals from both output terminals to a signal combining device such as a Y- or T-junction through a connection or connections which are operative to alter the phase interrelationships between the output signals from the two terminals selectively by different amounts depending upon their frequencies, and in this manner to cause the components of both frequencies to be supplied to the input terminals of the signal combining device in the same phase interrelationship so that they will add constructively and yield an output which is the sum of the magnitude of the two separate outputs from the waveguide junction. These connections may, for example, comprise a pair of waveguide sections whose effective electrical lengths are so chosen that they will operate to alter the phase interrelationships of the component signals traversing them by different amounts depending on their frequencies—more specifically, where the waveguide junction above referred to is a "magic-T" or hybrid ring, so that said difference in phase interrelationships of components appearing at the output terminals of the waveguide junction respectively of signals of the two different frequencies involved.

Figure 5:
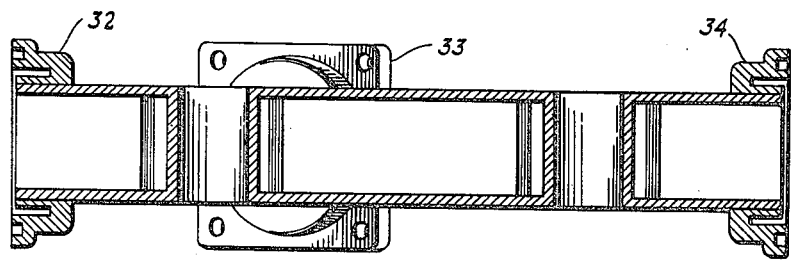
Figure 2:
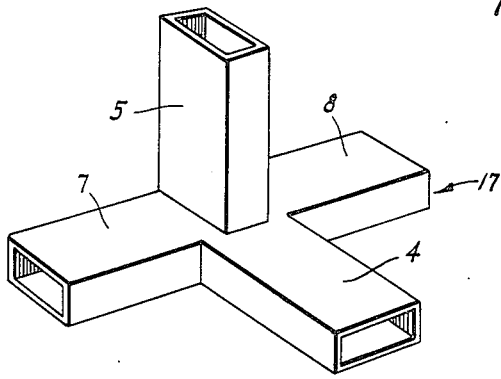

The principal of my invention, as well as other objects and advantages thereof, will be more fully understood from a consideration of the following detailed description with reference to the accompanying drawings in which:

Figure 1 is a diagrammatic representation of a system employing the invention,

Figure 2 is a perspective view of a "magic-T" waveguide junction suitable for use in the system of Figure 1, Figure 3 is a diagram comprising a line graph to which reference will be made in explaining the method of ascertaining the lengths of the waveguide sections 9 and 10, for example, in the embodiment of Figure 1, in accordance with the principles of the invention, and Figures 4 and 5 are sectional plan and elevational views respectively of an embodiment of the invention employing hybrid-ring waveguide junctions.

Referring now to Fig. 1, blocks 1 and 2 each represent typical radar sets, each of which may be of conventional form in accordance with the prior art. For example, each of them may be a conventional pulse type radar set adapted periodically to transmit time-spaced pulses of high frequency energy and to receive reflections of the transmitted pulses returned from more or less remotely disposed target objects, and, in response to such reflections, to produce indications of the directions and/or ranges of the objects producing the reflections. As indicated, the radar sets are operated at different frequencies—set 1 at a frequency $f_1$ and set 2 at a frequency $f_2$—these frequencies being those of the high frequency energy transmitted by each set. Also shown in the figure is an antenna 3, which may be in the form of an electromagnetic horn, as illustrated, or of any other form suitable for the transmission and reception of microwave energy. In accordance with the invention, it is proposed to use the single antenna 3 to radiate energy from both radar sets 1 and 2 and to receive reflections of energy of both frequencies from target objects. To this end it is necessary to combine the transmitted energy from both of the radar sets without producing substantial interaction between the sets, which might tend to interfere with their satisfactory operation, and to supply the combined energy to the common antenna 3 for transmission. Also it is necessary to provide means for separating the received reflections of the two different frequencies and for supplying the energy of each frequency to the radar set from which it originated.

To accomplish this result in accordance with the invention, radar sets 1 and 2 are coupled respectively to the input branches 4 and 5 of a four-terminal waveguide junction 6 having output branches 7 and 8. The output branches are connected respectively through waveguide sections 9 and 10 to the input branches 11 and 12 of a second four-branch wave-guide junction 13, having output branches 14 and 15. The output branch 14 of the latter junction is connected to the antenna 3 while the other output branch 15 of the said junction is connected to a dummy load 16.

For convenience of illustration and explanation, the waveguide junctions 6 and 13 in the figure are illustrated conventionally and not in accordance with their actual physical configurations. Actually, for example, each of these junctions may comprise a "magic-T" waveguide junction of the type hereinbefore discussed, the actual physical configuration of which is illustrated in Fig. 2, the various branches in the structure of Fig. 2 being numbered to correspond to the branches of the junction 6 as shown in Fig. 1. As hereinbefore pointed out, the "magic-T" junction, as illustrated in Fig. 2, comprises essentially the combination of an E-plane T-junction and an H-plane T-junction, consisting physically of a section 17 of standard electromagnetic waveguide, to which are joined two other sections of waveguide of the same cross-sectional dimensions, which comprise the branches 4 and 5. As illustrated, one of the latter branches is coupled into one of the sides of waveguide section 17 of wider dimension while the other section 5 is coupled into the side of section 17 which is of narrower dimension. As hereinbefore pointed out, components of signals injected into either of the branches 4 and 5 will be transmitted to both branches 7 and 8. However, in the case of signals injected into branch 4, the components transmitted to branches 7 and 8 respectively will be in phase, while in the case of signals injected into branch 5, the components transmitted to branch 7 and 8 respectively will be of opposite phases. Accordingly it will be seen that signals from radar set 1 in the embodiment according to Fig. 1, supplied to input branch 4 of waveguide junction 6, will produce components at the frequency $f_1$ in branches 7 and 8 which are in phase with each other. On the other hand signals from radar set 2, supplied to input branch 5, will produce components of frequency $f_2$ in branches 7 and 8 which are in phase opposition to each other. Components of both frequencies, appearing in the output branches 7 and 8 of waveguide junction 6, are supplied through waveguide sections 9 and 10 respectively to the input branches 11 and 12 of waveguide junction 13.

While, for the purposes of the invention, waveguide junction 13 may be a simple Y- or T-junction, as here illustrated it comprises a four-terminal junction which, like junction 6, may be in the form of a "magic-T," as illustrated in Fig. 2, the branches 11 and 12 corresponding respectively to the branches 7 and 8 of the structure of Fig. 2 and the branches 14 and 15 corresponding to the branches 4 and 5 respectively.

Referring again to Fig. 2, as hereinbefore pointed out, signals injected into both branches 7 and 8 of the "magic-T" junction will be transmitted substantially exclusively either to branch 4 or to branch 5, depending upon the phase relationship between the signals injected into the two first-named branches. Thus, if the signals injected into branches 7 and 8 are in phase, they will be transmitted substantially exclusively to branch 4, while if they are in phase opposition, they will be transmitted substantially exclusively to branch 5.

Referring again to Fig. 1, since it is desired that all of the component signals applied to branches 11 and 12 of junction 13 be transmitted to branch 14 and thence to antenna 3, and that none of the components thus applied be transmitted to branch 15, it is apparent that all of the components applied to branches 11 and 12 respectively must be in phase with each other. This imposes the requirement that components of the frequency $f_1$, which appear in phase in the branches 7 and 8 of the waveguide junction 6, must each be shifted in phase by an equal amount in the course of their passage through waveguide sections 9 and 10 respectively to branches 11 and 12 of waveguide junction 13. On the other hand, components of the frequency $f_2$, which appear in phase opposition in branches 7 and 8 respectively of waveguide junction 6, must be subjected to phase shifts which differ by 180° in the course of their passage through waveguide sections 9 and 10 respectively, in order that they may be in phase at branches 11 and 12 of waveguide junction 13. I have found that this objective can be achieved by selecting the effective electrical lengths of waveguide sections 9 and 10 so that they differ by an integral number of wavelengths at the frequency $f_1$, and so that they also differ by an odd number of half wavelengths at the frequency $f_2$. When this condition obtains, the components of both frequencies $f_1$ and $f_2$ will be supplied to the branches 11 and 12 of waveguide junction 13 so that the same phase relationship exists between components in the two branches irrespective of the fact that their phase relationships were different at the output branches 7 and 8 respectively of waveguide junction 6; therefore components of both frequencies applied to branches 11 and 12 of waveguide junction 13 will be transmitted substantially exclusively to branch 14 and thence to the antenna 3. While, under these circumstances, no signals of appreciable magnitude will be transmitted to branch 15 of waveguide junction 13, it is desirable to terminate the latter branch in a dummy load 16 having an impedance which matches that presented by junction 13 at branch 15 in order to prevent undesirable reflections into radar sets 1 and 2 should either of the center frequencies $f_1$ and $f_2$ depart substantially from their prescribed values.

From what has been said in the immediately preceding paragraphs it will readily be seen that the absolute lengths $L_1$ and $L_2$ of the waveguides 9 and 10, connecting the branches 7 and 8 of junction 6 respectively to the branches 11 and 12 of junction 13, are theoretically of no consequence. On the contrary, it is only necessary that the electrical lengths of the two guides shall differ by an amount which is equal to an integral number of wavelengths at the frequency $f_1$, and to an odd number of half-wavelengths at the frequency $f_2$. This simply means that the length of one of the guides may be arbitrarily selected to be the minimum necessary to satisfy physical requirements imposed by the actual physical spacing of the waveguide junctions with respect to each other, and that the difference in length of the other guide from the first must then be selected to satisfy the aforementioned condition. Expressed mathematically this condition is as follows:

$$\Delta L = n\lambda_1 = \frac{m\lambda_2}{2} \quad (1)$$

or $$\frac{n}{m} = \frac{\lambda_2}{2\lambda_1} \quad (2)$$

where $\Delta L$ is the difference in length of the two waveguide sections, $\lambda_2$ and $\lambda_1$ are the wavelengths in the waveguides of signals at frequencies $f_1$ and $f_2$ respectively, $n$ is an integer, and $m$ is an odd integer. If the values of the frequencies $f_1$ and $f_2$ are such that $$\frac{\lambda_2}{2\lambda_1}$$

is a rational fraction, there are an infinite number of exact solutions of Equation 2 to which there correspond an equal number of possible differences in length $\Delta L$, many of which are so large as to be practically undesirable. If $$\frac{\lambda_2}{2\lambda_1}$$

happens to be an irrational fraction, there is no exact solution of Equation 2, but there are then a great number of values of $m$ and $n$ which approximate exact solutions to any desired degree of accuracy, and to which there correspond an equal number of substantially correct values of $\Delta L$. Since it will generally be desirable to keep the lengths of the two waveguide sections to a minimum, for reasons set forth hereinafter, the most practical value of $\Delta L$ will be that obtained when the values of the integers $m$ and $n$, which substantially satisfy Equation 2, are smallest.

The values of $m$ and $n$ which substantially satisfy Equation 2 can be found by trial and error. I have found, however, that a more convenient method of determining their values, and also the value of $\Delta L$, in any specific instance, is by a graphical procedure which will now be discussed with reference to the diagram of Fig. 3. In the diagram there are first laid off a long line O—O', commencing at the origin O, equal intervals, each of which represents, to a predetermined scale, a wavelength at the frequency $f_1$. These intervals are defined by the crosses designated as integral multiples of $\lambda_1$. Next there are laid off along the same line, commencing at the same origin and to the same scale, points whose respective displacements from the origin O are equal to odd multiples of one-half wavelength at the frequency $f_2$. These, in the diagram, are represented by dots designated as odd integral multiples of $$\frac{\lambda_2}{2}$$

It will be observed that in general, in the diagram, the dots, corresponding to displacements of odd intergral multiplies of $$\frac{\lambda_2}{2}$$

from the origin O, are staggered with respect to the crosses corresponding to displacement of integral multiples of $\lambda_1$, but that, progressing out from the origin, the spacing between adjacent dots and crosses diminishes gradually until a coincidence of a dot and a cross occurs at the point for which $$6\lambda_1 = \frac{11\lambda_2}{2}$$

The displacement of this point from the origin O is then equal to the required difference in length $\Delta L$ of the waveguide sections 9 and 10 such that, for the frequency $f_1$, the difference in length is equal to an even number of wavelengths, while for the frequency $f_2$, the difference in length is equal to an odd number of half-wavelengths. Thus it is readily possible to ascertain, by inspection of the diagram, the required difference in length of the two guides, which, in this particular case, is equal to 6 wavelengths at the frequency $f_1$ or 5½ wavelengths at the frequency $f_2$, corresponding to values for $n$ and $m$ of 6 and 11 respectively.

Thus far the embodiment of the invention illustrated in Fig. 1 has been discussed solely with reference to its operation in combining signals of two different frequencies from the separate radar sets 1 and 2, and in supplying both signals to the common antenna 3, while preventing undesirable interaction between the radar sets.

However, as hereinbefore mentioned, another object of the invention is to provide means for separating components of two different frequencies contained in a single composite signal, and for supplying the separated signals to separate utilization devices so that each signal is supplied substantially exclusively to a different one of the utilization devices. Considering this problem more particularly with reference to the arrangement shown in Figure 1, the combined signals of frequencies $f_1$ and $f_2$ from radar sets 1 and 2 are supplied to the common antenna 3 and radiated thereby into space. Reflections of signals of both frequencies from target objects are also intercepted by the antenna and are supplied to the waveguide junction 13 through branch 14 thereof. By reason of its inherent characteristics, as hereinbefore mentioned, waveguide junction 13 operates to divide the signals thus supplied to branch 14, irrespective of their frequencies, into separate parts of substantially equal energy which appear in branches 11 and 12 of the junction respectively, in substantially like phases.

Furthermore, as has already been mentioned, waveguide junction 6 is characterized in that signals supplied to its branches 7 and 8, and which are substantially alike in phase, will be transmitted substantially exclusively to branch 4; while, on the other hand, signals supplied to branches 7 and 8, and which are substantially in phase opposition with respect to each other, will be transmitted substantially exclusively to branch 5. Owing to the fact that the difference in length between waveguide sections 9 and 10 has been made such that it is equal to an integral number of wavelengths at the frequency $f_1$, and to an odd number of half-wavelengths at the frequency $f_2$, the signals traversing them from branches 11 and 12 of waveguide junction 13 to branches 7 and 8 of waveguide junction 6 will have their phase interrelationships altered by different amounts for the two different frequencies. Thus, although the phase interrelationships at branches 11 and 12 of junction 13 are the same for both frequencies $f_1$ and $f_2$, the signals of frequency $f_1$ will be shifted in phase with respect to each other by an integral multiple of 360° and will therefore arrive in phase at branches 7 and 8 of junction 6. These signals, therefore, will be transmitted substantially exclusively through branch 4 of junction 6 to radar set 1, whence they originated. On the other hand, signals of frequency $f_2$, appearing in branches 11 and 12 of the junction 13, will be shifted in phase with respect to each other by an odd multiple of 180° in the course of their traversal of waveguide sections 9 and 10 and will be supplied to branches 7 and 8, respecstively, of junction 6 in phase opposition. Accordingly they will be transmitted substantially exclusively through branch 5 of the junction to radar set 2, from which they originated. Thus it will be seen that the arrangement according to Fig. 1 operates not only to combine the signals of two different frequencies issuing from radar sets 1 and 2, while preventing interaction between the two sets, but also operates reciprocally to separate incoming signals according to their frequencies and to supply the separated signals respectively to the radar sets from which they originated.

It will be appreciated, of course, that, in general, the signals issuing from radar sets 1 and 2 in the embodiment according to Fig. 1, will not, in either instance, consist of but a single discrete frequency. On the contrary, the signals from each set will usually comprise a plurality of frequency components extending over a band. Apparently, therefore, it will only be possible to select the difference in the lengths of the waveguide sections 9 and 10 to have exactly the correct value for but a single frequency within the band. For other frequencies in the band the difference in length will depart by varying amounts from the desired value and, as a result, the objective, of causing all of the signals transmitted through waveguides 9 and 10 to arrive at branches 11 and 12 of junction 13 with the same phase interrelationship, will not be fully achieved. However, if the bandwidths involved are not unduly wide, the degree of approximation to the desired condition will be satisfactory for all practical purposes. It is to be noted however, in this connection, that, for given bandwidths of the signals issuing from radar sets 1 and 2, the extent to which the phase interrelationships between the signals supplied to junction 13 will differ will vary as a function of the magnitude of the difference in the lengths of the waveguide sections 9 and 10, becoming greater as the magnitude of difference increases. The reasons for this will be apparent from a consideration of the simple fact that signals of the same phase and slightly differing frequencies will be subjected to large phase displacements with respect to each other upon traversing a waveguide whose length is a large number of wavelengths at either of the signal frequencies. For this, as well as for other practical reasons, it will generally be desirable to minimize the difference in the lengths of the waveguide sections 9 and 10. In fact it may be desirable to accept a reasonable approximation to, rather than an exact satisfaction of, the condition that the difference in the lengths of the two sections shall be equal to an integral number of wavelengths at one frequency and to an odd number of half-wavelengths at the other frequency, since this will permit a reduction in the magnitude of the difference in length. This fact will be readily apparent from a consideration of the diagram of Fig. 3, which proves to be of considerable assistance in effecting such a compromise. Thus, for example, it will be seen that if the magnitude of the difference $\Delta L$ is made equal to $5\lambda_1$, the departure from an odd number of half wavelengths at the other frequency will still be relatively small. Alternatively, of course, the carrier frequency of one of the radar sets might be shifted slightly with respect to the other to permit the satisfaction of the prescribed conditions as to the difference in the lengths of the two guides while reducing the actual magnitude of said difference.

It will be appreciated by those skilled in the art that the difference in effeceive lengths of the waveguide sections 9 and 10 may be achieved not only by using sections of waveguide which differ in physical length, but also in other well-known ways such as, for example, by utilizing different dielectrics in the respective guide sections, or portions thereof. These expedients, however, are well understood and need not be discussed in detail.

It will also be noted that although, in the embodiment of Fig. 1, all of the signal components applied to branches 11 and 12 respectively are in phase with each other and therefore are supplied exclusively to branch 14, it would be equally feasible to supply the components to branches 11 and 12 respectively in phase opposition, in which event all of the signals would be transmitted exclusively to branch 15. Under such circumstances, obviously, antenna 3 should be connected to branch 15, and dummy load 16 to branch 14. The required phase opposition relationship between signals applied to branches 11 and 12 respectively is obtainable simply by altering the effective electrical lengths of waveguide sections 9 and 10 so that the frequencies for which they differ respectively by an integral number of wavelengths and by an odd number of half wavelengths are interchanged as compared with the conditions as described with reference to the arrangement of Fig. 1.

As hereinbefore mentioned, the so-called hybrid ring waveguide junction is the substantial electrical equivalent of the "magic-T" junction, and hence may be used for either or both of the junctions 6 and 13 in the embodiment of Fig. 1. In fact, their use makes possible the combination of junctions 6 and 13 and waveguide sections 9 and 10 in that embodiment into an exceedingly compact and convenient structure of the form illustrated in the sectional plan and elevational views of Figs. 4 and 5, to which reference is now made. The structure, as illustrated in these figures, comprises a pair of hybrid ring waveguide junctions 20 and 21, which are essentially identical in basic configuration. The junction 20 comprises an annular waveguide section having a mean circumference of 1½ wavelengths at a frequency somewhere intermediate predetermined frequencies $f_1$ and $f_2$, which are the mean frequencies of the signals which are to be supplied to the structure. Electrically coupled to this annular waveguide section, at spaced intervals about its circumference, are four waveguide branches 24, 25, 26 and 27. The circumferential spacing between branches 24, 25, 26 and 27, at their points of juncture to the annular section, is made equal to a quarter wavelength at the aforementioned frequency which is intermediate frequencies $f_1$ and $f_2$, while the spacing between branches 27 and 24 is made equal to three-quarters of a wavelength at the same frequency. The branches 24 and 26 are normally designated input branches to the junction and may be provided with conventional coupling flanges 32 and 33, respectively, whereby they are adapted to be coupled to separate input signal sources such as the radar sets 1 and 2 of the embodiment according to Fig. 1.

Similarly, waveguide junction 21 comprises an annular waveguide section whose circumference is the same as that of the annular section of junction 20, and to which are electrically coupled waveguide branches 28, 29, 30 and 31. The spacing between branches 28, 29, 30 and 31 is made equal to a quarter wavelength, as in the case of junction 20, and the spacing between branches 31 and 28 is likewise made equal to three-quarters of a wavelength, as in the case of branches 27 and 24 of junction 20. Branches 28 and 30 of junction 21 are normally designated input branches, while branches 29 and 31 are designated output branches. However, in the case of junction 21, only the output branch 31 is provided with a coupling flange 34 whereby it may be coupled to a utilization device such, for example, as antenna 3 in the embodiment according to Fig. 1. Output branch 29, on the other hand, is fitted with an appropriately tapered slug 35 of lossy material, which functions in accordance with principles well known in the prior art to provide a substantially reflectionless termination for branch 29. Output branches 25 and 27 of junction 20 are connected respectively through waveguide sections 22 and 23 to the input branches 30 and 28 of waveguide junction 21. As in the case of the arrangement of Fig. 1 the lengths of the waveguide sectitons 22 and 23 are so chosen that they will differ by an integral number of wavelengths at the frequency $f_1$ and by an odd number of half wavelengths at the frequency $f_2$.

Considering now the operation of the structure as illustrated, in response to input signals of frequencies $f_1$ and $f_2$ injected into branches 24 and 26 respectively of waveguide junction 20, the signals injected into branch 24 will be propagated in both directions around the annular portion of the junctiton. In view of the spacings of the branches of the junction, as hereinbefore mentioned and as shown in the figure, the signals thus propagated will arrive at branch 25 having their respective electric vectors in phase opposition. The same relationship will exist with respect to signals arriving from opposite directions at branch 27. Accordingly, and by reason of the existence of these phase relationships, the signals at these points will be caused to propagate into both of these output branches. It will be observed, however, that, owing to the half wavelength difference in the spacing of branches 25 and 27 from branch 24, the signals thus propagated into these branches respectively will differ mutually in phase by 180°. Further it will be observed that signals injected into branch 24 and propagated in opposite directions around the annular section will arrive at branch 26 with their electric vectors in the same phase so that none of these signals will be propagated into branch 26.

Similarly signals injected into branch 26 will be propagated in both directions around the annular section of junction 20 and will arrive at branches 25 and 27 respectively with their respective electric vectors in phase opposition so as to be propagated into branches 25 and 27. Here, however, it will be noted that since branches 25 and 27 are equally spaced from branch 26, the signals propagated into branches 25 and 27 respectively, will be of like phase. Further it will be observed that the signals injected into branch 26, and propagated in opposite directions around the annular section, will arrive at branch 24 with their electric vectors in the same phases so that none of these signals will be propagated into branch 24.

Summarizing, therefore, signals injected into branch 24 will be transmitted to branches 25 and 27, respectively, in phase opposition; while signals injected into branch 26 will be transmitted to branches 25 and 27 respectively in like phases. Hence, if the signals injected into branch 24 are of frequency $f_1$ and those injected into branch 26 are of frequency $f_2$, the signals of frequency $f_1$ propagated into branches 25 and 27 respectively will be in phase opposition, while those of frequency $f_2$ will be in phase. However, owing to the fact that the difference in length between waveguide sections 22 and 23 is equal to an integral number of wavelengths at the frequency $f_1$, and to an odd number of half wavelengths at the frequency $f_2$, signals of both frequencies $f_1$ and $f_2$ will arrive at branches 28 and 30 of waveguide junction 21 in phase opposition. Signals thus arriving through both of these branches will each be propagated in opposite directions in the annular section of junction 21. Owing to the spacing of the several branches of junction 21 in the manner hereinbefore specified, the two components thus propagated in opposite directions will be delivered to branch 31 with their electric vectors in phase opposition so as to cause them to be propagated into branch 31. Furthermore, owing to the half wavelength difference in the spacing of branch 31, with reference to branches 28 and 30 respectively, signals of both frequencies from branch 28 are delivered to branch 31 in phase with those from branch 30 so as to combine additively in branch 31. On the other hand, signals from branch 28 propagated in opposite directions in the annular section of junction 21 will be in phase opposition with those from branch 30 at the junction of branch 29 with the annular section so that no appreciable amount of energy will be propagated into branch 29. Hence there will be no substantial loss of energy in the reflectionless termination 35.

Thus it will be seen that energy of two different frequencies from two different sources injected into branches 24 and 26 respectively, of waveguide junction 20, will be combined without interaction between the sources and will be transmitted to the common output branch 31 for supply to any suitable utilization means whose impedance preferably matches the impedance of the branch.

Similarly, the structure as illustrated in Figs. 4 and 5 operates reciprocally to separate signals of two different frequencies injected into branch 31 of waveguide junction 21, and to supply them respectively to branches 24 and 26 of waveguide junction 20 for supply to separate utilization devices without introducing interaction between said utilization devices. The details of the operation of the structure to effect this result will be apparent to those skilled in the art in view of the foregoing discussion, and therefore need not be discussed further. Suffice it to say that signals injected into branch 31 of waveguide junction 21 will be supplied to branches 28 and 30 respectively in opposite phase relationships. Owing to the difference in lengths of waveguide sections 22 and 23, signals of one of these frequencies will be supplied to branches 25 and 27 in the same phase while signals of the other frequency will be supplied to the same branches of junction 20 in opposite phase relationships. The former signals will then be supplied substantially exclusively to branch 26 of junction 20, while the latter signals will be supplied substantially exclusively to branch 24 of the junction.

While the invention has been described by reference to certain representative embodiments, its principles have been set forth in sufficient detail so that numerous other possible embodiments thereof will occur to those skilled in the art upon reading the foregoing specification. Likewise, while the invention has been described with particular reference to its application to a pulse type radar system, it will be understood that it is in no way limited to use in such a system but may be applied in any case in which it is desired to combine signals from a plurality of different sources without producing interaction between the sources, and irrespective of whether the signals to be combined are intermittent or continuous in character.

I claim:

1. Signal combining apparatus comprising: a first waveguide junction, having first, second, third and fourth branches, said junction being constructed and arranged so that signals injected into either of said first and second branches are transmitted substantially exclusively to said third and fourth branches, the signals transmitted respectively to said third and fourth branches in response to signals injected into said first branch being substantially in phase with each other, and the signals transmitted respectively to said third and fourth branches in response to signals injected into said second branch being in substantial phase opposition; a second waveguide junction, having first, second and third branches, said junction being constructed and arranged so that signals injected into said first and second branches, and which are substantially alike in phase, are transmitted with maximum efficiency to said third branch; a waveguide section connecting the third branch of said first junction to the first branch of said second junction and another waveguide section connecting the fourth branch of said first junction to the second branch of said second junction, said sections differing in effective electrical length by an odd number of half wavelengths at a predetermined first frequency, and by an integral number of wavelengths at a predetermined substantially different frequency, a source of signals of said first frequency for supplying said last-named signals to said second branch of said first waveguide junction; and a source of signals of said different frequency for supplying said signals of said different frequency to said first branch of said first waveguide junction.

2. Signal separating apparatus comprising: a first waveguide junction, having first, second, third and fourth branches, said junction being constructed and arranged so that signals injected into both said first and second branches are transmitted substantially exclusively to said third branch if they are substantially alike in phase, and are transmitted substantially exclusively to said fourth branch if they are substantially opposite in phase; a second waveguide junction, having first, second and third branches, said junction being constructed and arranged so that portions of signals injected into said first branch are transmitted to both said second and said third branches, the signals thus transmitted being substantially alike in phase; a waveguide section connecting the second branch of said second junction to the first branch of said first junction and another waveguide section connecting the third branch of said second junction to the second branch of said first junction, said sections differing in effective electrical length by an odd number of half wavelengths at a predetermined first frequency, and by an integral number of wavelengths at a predetermined substantially different frequency; and a source of signals of said first frequency and of said different frequency, for supplying said signals from said source to said first branch of said second waveguide junction.

3. Signal combining apparatus comprising: a first waveguide junction, having first, second, third and fourth branches, said junction being constructed and arranged so that signals injected into either of said first and second branches are transmitted substantially exclusively to said third and fourth branches, the signals transmitted respectively to said third and fourth branches in response to signals injected into said first branch being substantially in phase with each other, and the signals transmitted respectively to said third and fourth branches in response to signals injected into said second branch being in substantial phase opposition; a second waveguide junction, having first, second and third branches, said junction being constructed and arranged so that signals injected into said first and second branches, and which are substantially opposite in phase, are transmitted with maximum efficiency to said third branch; a waveguide section connecting the third branch of said first junction to the first branch of said second junction and another waveguide section connecting the fourth branch of said first junction to the second branch of said second junction, said sections differing in effective electrical length by an odd number of half wavelengths at a predetermined first frequency, and by an integral number of wavelengths at a predetermined substantially different frequency; a first source of signals at said first frequency; another source of signals at said different frequency; and means for supplying said signals from said first source and from said other source to said first and second branches of said first waveguide junction, respectively.

4. Signal separating apparatus comprising: a first waveguide junction, having first, second, third and fourth branches, said junction being constructed and arranged so that signals injected into both said first and second branches are transmitted substantially exclusively to said third branch if they are substantially alike in phase, and are transmitted substantially exclusively to said fourth branch if they are substantially opposite in phase; a second waveguide junction, having first, second and third branches, said junction being constructed and arranged so that portions of signals injected into said first branch are transmitted to both said second and said third branches, the signals thus transmitted being substantially opposite in phase; a waveguide section connecting the second branch of said second junction to the first branch of said first junction and another waveguide section connecting the third branch of said second junction to the second branch of said first junction, said sections differing in effective electrical length by an odd number of half wavelengths at a predetermined first frequency, and by an integral number of wavelengths at a predetermined substantially different frequency; and a source of signals of said first frequency and of said different frequency, for supplying said signals from said source to said first branch of said second waveguide junction.

5. Signal combining apparatus comprising: a first device, having a pair of input terminals and a pair of output terminals, said device being responsive to signals applied to either of said input terminals to transmit said signals to both of said output terminals, the phase relationship between signals transmitted to said output terminals differing by a predetermined amount depending upon whether they are produced in response to signals applied to one or the other of said input terminals and said device being substantially unresponsive to signals applied to either of said input terminals to transmit said signals to the other of said input terminals, a second device, having a pair of input terminals and an output terminal, said device being responsive to signals applied to its input terminals to transmit said signals to its output terminal, means for conveying signals from the output terminals of said first device respectively to the input terminals of said second device, said means being operative to alter the phase relationships between signals traversing them by amounts which, for two predetermined different frequencies, differ by said predetermined difference in phase relationship between the signals transmitted to the output terminals respectively of said first device from its input terminals, and a source of signals at said two predetermined different frequencies for suppling signals of each of said two frequencies to different ones of said pair of input terminals of said first device.

6. Signal combining apparatus comprising: a first device having a pair of input terminals and a pair of output terminals, said device being responsive to signals applied to either of said input terminals to transmit said signals to both of said output terminals, the signals transmitted to said output terminals respectively in response to signals applied to one of said input terminals having a predetermined first phase interrelationship, the signals transmitted to said output terminals respectively in response to signals applied to the other of said input terminals having a predetermined second phase interrelationship differing from said first, and said device being substantially unresponsive to signals applied to either of said input terminals to transmit said signals to the other of said input terminals; a second device having a pair of input terminals and an output terminal, said device being responsive to signals of a predetermined third phase interrelationship applied respectively to its input terminals to transmit said signals to its output terminal with maximum efficiency, means for conveying signals from the output terminals of said first device respectively to the input terminals of said second device, said means being constructed and arranged to alter the phase interrelationship between signals of a predetermined first frequency traversing them by an amount and in a sense substantially equal to the difference resulting from the algebraic subtraction of said first phase interrelationship from said third phase interrelationship, and to alter the phase interrelationship between signals of a predetermined second frequency traversing them by an amount and in a sense substantially equal to the difference resulting from the algebraic subtraction of said second phase interrelationship from said third phase interrelationship; means for generating signals at said first frequency and for supplying them to said one of said input terminals of said first device; and means for generating signals at said second frequency and for supplying them to said other input terminal of said first device.

7. Signal separating apparatus comprising a first device having a pair of input terminals and a pair of output terminals, said device being responsive to signals applied to both of said input terminals to transmit said signals substantially exclusively to one of said output terminals if said applied signals have a predetermined first phase interrelationship, and substantially exclusively to the other of said output terminals if said applied signals have a predetermined second phase interrelationship; a second device having an input terminal and a pair of output terminals, said device being responsive to signals applied to said input terminal to transmit said signals to both of said output terminals, the signals thus transmitted having a predetermined third phase interrelationship; means for conveying signals from the output terminals of said second device respectively to the input terminals of said first device, said means being constructed and arranged to alter the phase interrelationship between signals of a predetermined first frequency traversing them by an amount and in a sense substantially equal to the difference resulting from the algebraic subtraction of said first phase interrelationship from said third phase interrelationship, and to alter the phase interrelationship between signals of a predetermined second frequency traversing them by an amount and in a sense substantially equal to the difference resulting from the algebraic subtraction of said second phase interrelationship from said third phase interrelationship; and means for generating signals of said first and second frequencies and for supplying them to said input terminal of said second device.

8. A three-terminal bidirectional signal transfer apparatus adapted to transmit signals of different frequencies applied respectively to two of the terminals to the third terminal thereof, to transmit signals of different frequencies applied to said third terminal selectively to said first two terminals respectively, and substantially to inhibit transmission of signals between said first two terminals, said apparatus comprising a first device having first, second, third and fourth terminals, said first and second terminals of said device constituting the two first-named terminals of said signal transfer apparatus, said device being responsive to signals applied to its first terminal to produce signals having a predetermined first phase interrelationship at its third and fourth terminals, said device being responsive to signals applied to its second terminal to reproduce signals having a predetermined second phase interrelationship at its third and fourth terminals, said device being responsive to signals having said first phase interrelationship applied to its third and fourth terminals respectively to transmit said signals substantially exclusively to its first terminal, said device being responsive to signals having said second phase interrelationship applied to its third and fourth terminals respectively to transmit said signals substantially exclusively to its second terminal, and said device being substantially unresponsive to transmit signals between its first and second terminals; a second device having first, second and third terminals, said third terminal of said device constituting said third terminal of said signal transfer apparatus, said second device being responsive to signals having a predetermined third phase interrelationship applied to its first and second terminals to transmit said signals with maximum efficiency to its third terminal, and said second device being responsive to signals applied to its third terminal to produce signals of said third phase interrelationship at its first and second terminals; and means for conveying signals between the third terminal of said first device and the first terminal of said second device and between the fourth terminal of said first device and the second terminal of said second device respectively, said means being constructed and arranged to alter the phase interrelationship between signals of a predetermined first frequency traversing them by an amount and in a sense substantially equal to the difference resulting from the algebraic subtraction of said first phase interrelationship from said third phase interrelationship, and to alter the phase interrelationship between signals of a predetermined second frequency traversing them by an amount and in a sense substantially equal to the difference resulting from the algebraic subtraction of said second phase interrelationship from said third phase interrelationship; means for generating signals of said first and second frequencies and for supplying them to said first and second terminals of said first device respectively; and means for supplying signals of both of said frequencies to said third terminal of said second device.

References Cited in the file of this patent

UNITED STATES PATENTS

| | | |
|---|---|---|
| 2,318,237 | Lindenblad | May 4, 1943 |
| 2,445,895 | Tyrrell | July 27, 1948 |
| 2,447,543 | Smullin | Aug. 24, 1948 |
| 2,462,841 | Bruck et al. | Mar. 1, 1949 |
| 2,531,419 | Fox | Nov. 28, 1950 |
| 2,564,030 | Purcell | Aug. 14, 1951 |
| 2,587,590 | Brewer | Mar. 4, 1952 |
| 2,593,120 | Dicke | Apr. 15, 1952 |